United States Patent
Hsu

(10) Patent No.: US 8,273,271 B2
(45) Date of Patent: Sep. 25, 2012

(54) METHOD FOR MAKING OPTICAL FIBER CONNECTOR

(75) Inventor: Chia-Ling Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 90 days.

(21) Appl. No.: 12/913,788

(22) Filed: Oct. 28, 2010

(65) Prior Publication Data

US 2011/0278748 A1    Nov. 17, 2011

(30) Foreign Application Priority Data

May 11, 2010   (TW) ................................ 99114922 1

(51) Int. Cl.
*B29D 11/00*    (2006.01)

(52) U.S. Cl. ..................... 264/1.25; 264/1.26

(58) Field of Classification Search .................. 264/1.25, 264/1.26
See application file for complete search history.

(56) References Cited

U.S. PATENT DOCUMENTS

| 5,241,612 A * | 8/1993 | Iwama | 385/74 |
| 6,719,927 B2 * | 4/2004 | Sakurai et al. | 264/1.25 |
| 6,875,384 B1 * | 4/2005 | Whitney | 264/40.5 |

OTHER PUBLICATIONS

Kohno; Tsuguo, Ozawa; Norimitsu, Miyamoto; Kozo, Musha; Tohru. "High precision optical surface sensor", Applied Optics, 1998, V 27, No. 1, p. 103-108.*

* cited by examiner

*Primary Examiner* — Yogendra Gupta
*Assistant Examiner* — Alison Hindenlang
(74) *Attorney, Agent, or Firm* — Altis Law Group, Inc.

(57) ABSTRACT

A method for making an optical fiber connector includes a mold. The mold includes a first mold portion having inserts each for molding a blind hole preform, and a second mold portion having a flat molding surface for forming a flat optical surface, and a number of curved molding surfaces for forming lens caps. A non-contact detection instrument is provided to project a light beam to the bottom of the blind hole preforms with the light beam passing through the flat optical surface. Then a coarseness factor image is obtained and analyzed to determine whether a coarseness factor of the bottom of the corresponding blind hole preform is acceptable and the corresponding insert is modified if it is not acceptable. Finally, the curved molding surfaces are aligned with the inserts to form the lens caps on the flat optical surface.

7 Claims, 4 Drawing Sheets

METHOD FOR MAKING OPTICAL FIBER CONNECTOR

BACKGROUND

1. Technical Field

The present disclosure relates to optical fiber connectors, and particularly to a method for making an optical fiber connector.

2. Description of Related Art

Optical fiber connectors are widely used for connecting optical fibers and other devices in optical fiber communications. Light loss is always a critical problem in the optical fiber communications.

A typical optical fiber connector has blind holes for receiving optical fibers, and lenses aligning with the respective optical fibers. A bottom of the blind holes is an interface between the lenses and the optical fibers. A coarseness factor of the bottom of the blind holes influences the light loss in the optical fiber communications.

However, as the blind holes are usually deep and thin, it is difficult to detect the coarseness factor of the bottom of the blind holes.

What is needed, therefore, is a method for making optical fiber connector which can overcome the above shortcomings.

BRIEF DESCRIPTION OF THE DRAWINGS

Many aspects of the present method can be better understood with reference to the following drawings. The components in the drawings are not necessarily drawn to scale, the emphasis instead being placed upon clearly illustrating the principles of the present method. Moreover, in the drawings, like reference numerals designate corresponding parts throughout the several views.

DETAILED DESCRIPTION

Embodiments of the present method will now be described in detail below and with reference to the drawings.

Figure 1:
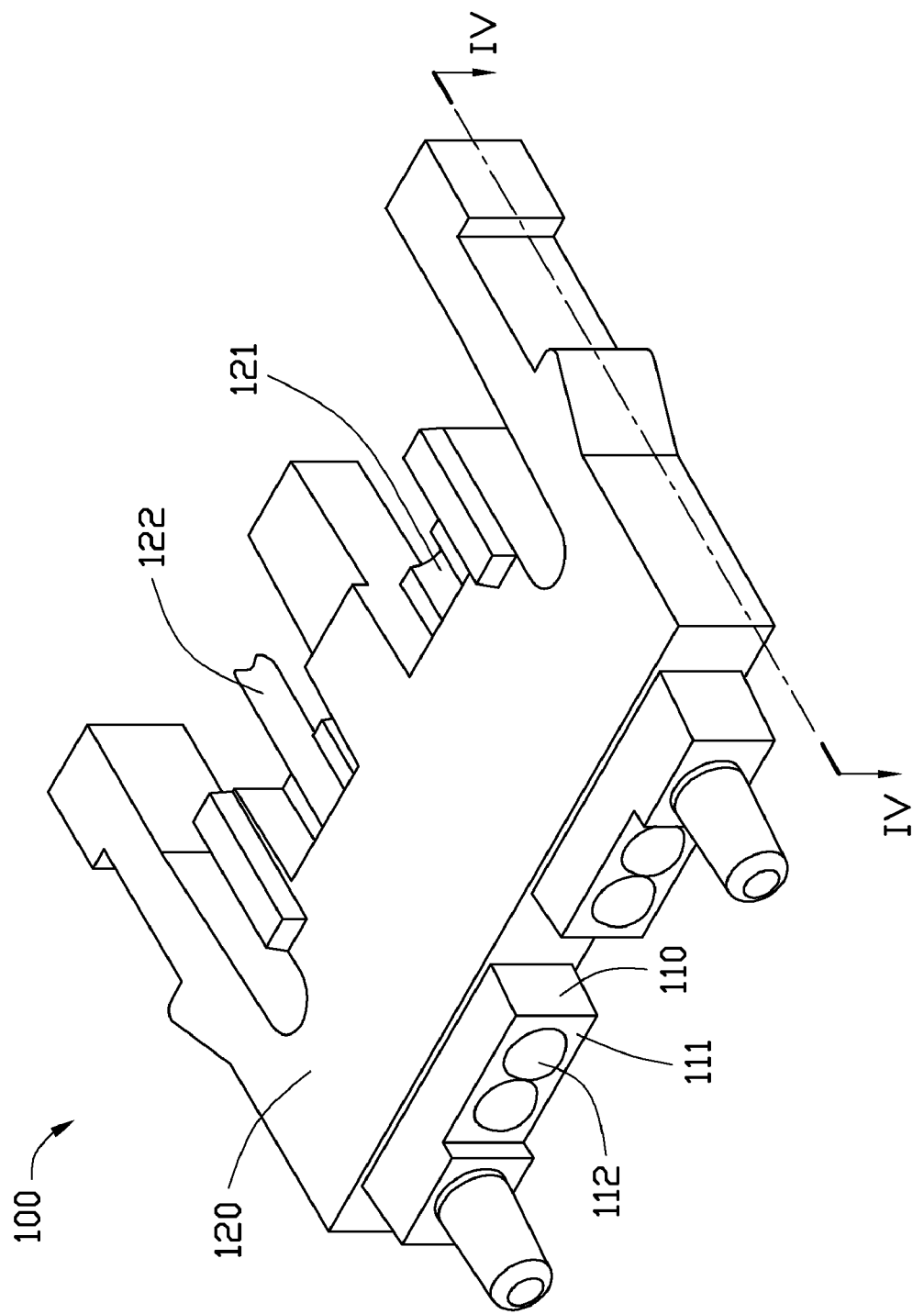
FIG. 1 is a schematic view of an optical fiber connector in accordance with one embodiment.
Figure 4:
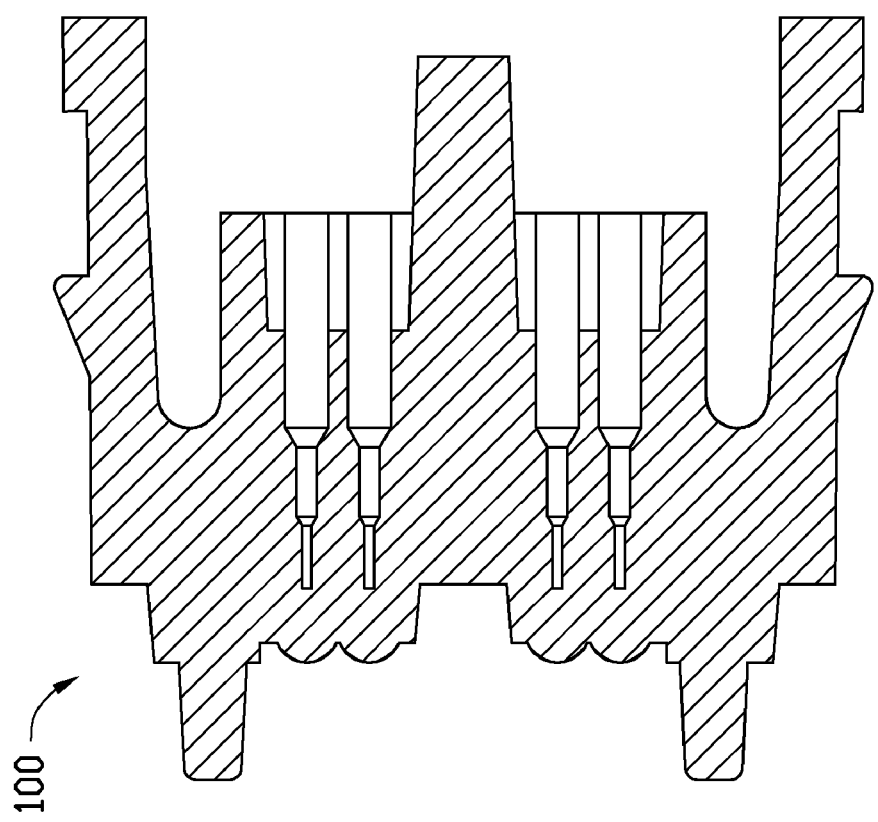
FIG. 4 is a sectional view of the optical fiber connector shown in FIG. 1, taken along the line IV-IV.

Referring to FIGS. 1 and 4, an optical fiber connector 100 in accordance with one embodiment is provided. The optical fiber connector 100 includes a blind hole portion 120 and a lens portion 110. The blind hole portion 120 has a number of blind holes 121 each for receiving an optical fiber 122. The lens portion 110 includes a flat optical surface 111 located at an end thereof, and a number of lens caps 112 formed on the flat optical surface 111. Each of the lens caps 112 has a curved outer surface, and each of the lens caps 112 is aligned with one of the blind holes 121.

Figure 2:
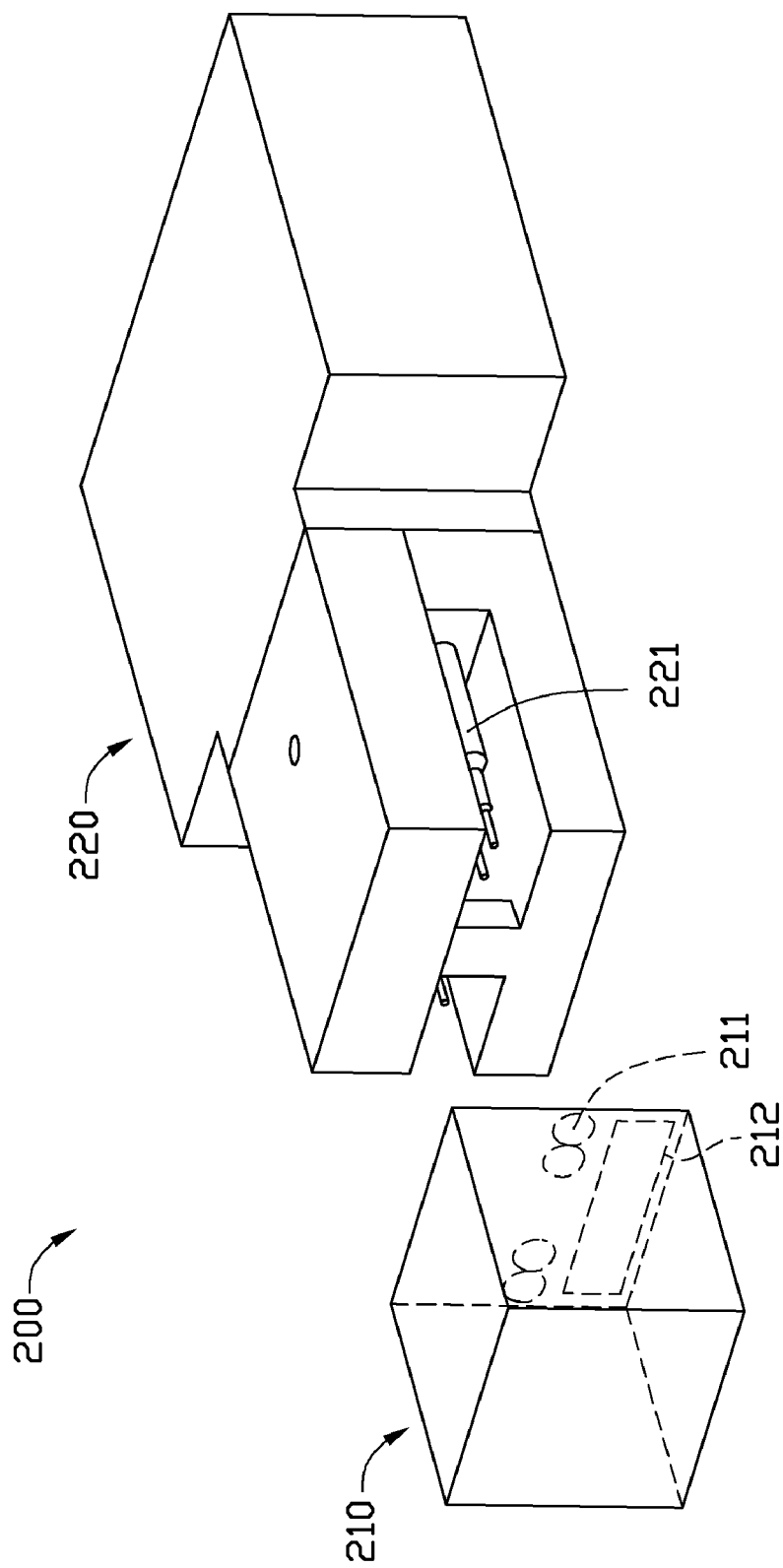
FIG. 2 is a schematic view of a mold, which is capable of forming both an optical fiber connector, and an optical fiber connector preform needed in the coarseness factor detection.
Figure 3:
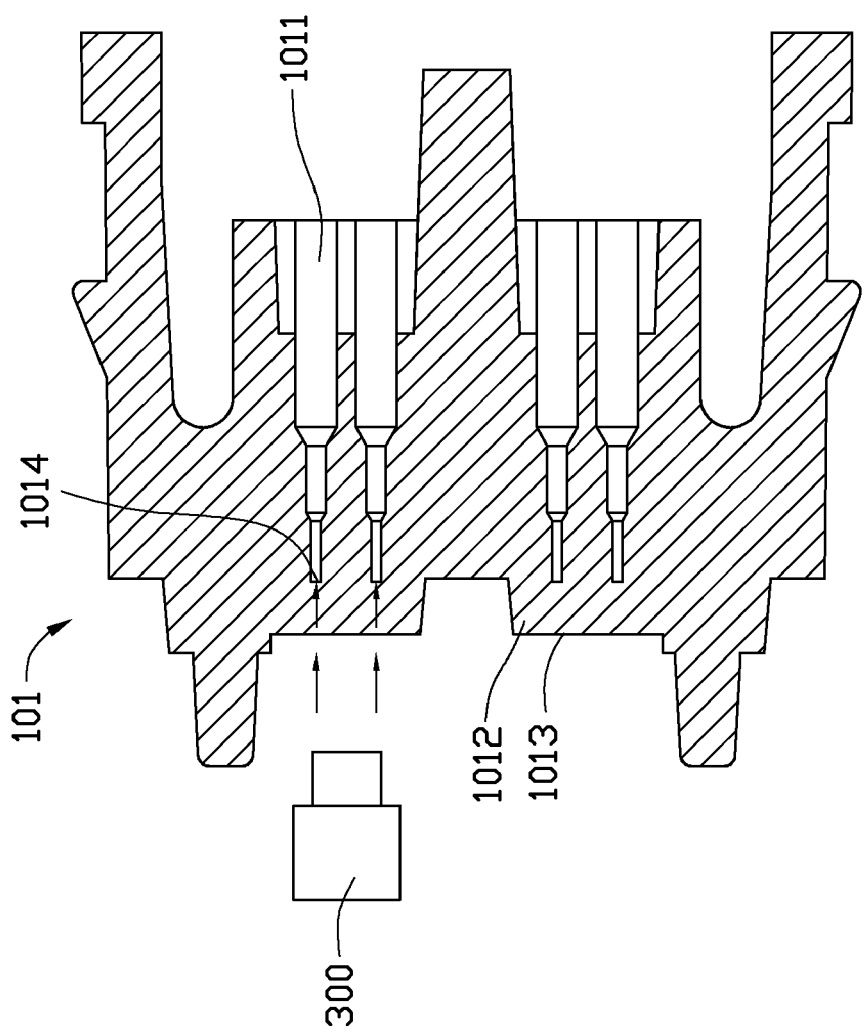
FIG. 3 shows an optical fiber connector preform made by the mold of FIG. 2, and a method for detecting a coarseness factor of a bottom of an optical fiber blind hole in the optical fiber preform.

Referring also to FIGS. 2 and 3, a method for making the optical fiber connector 100 includes the following steps.

First, a mold 200 is provided. In the present embodiment, the mold 200 is first used for molding an optical fiber connector preform 101, which is needed for coarseness factor detection, however, once the coarseness factor detection is acceptable, the mold 200 can be directly used for molding the optical fiber connector 100 illustrated above.

The optical fiber connector preform 101 includes a blind hole portion preform 1013 having a number of blind holes 1011, and a lens portion preform 1012 having a flat optical surface 1013 located at an end thereof.

The mold 200 includes a first mold portion 220 for molding the blind hole portion preform 1013, and a second mold portion 210 for molding the lens portion 110 and as well as the lens portion preform 1012. The first mold portion 220 includes a number of inserts 221 for insert molding the blind holes 1011.

The second mold portion 210 includes a curved surface molding region 211 and a flat surface molding region 212. The curved surface molding region 211 molds the lens caps 112 of the optical fiber connector 100. The flat surface molding region 212 forms the flat optical surface 1013 of the optical fiber connector preform 101.

Second, a non-contact detection instrument 300 is provided for detecting a coarseness factor of the bottom 1014 of each of the blind holes 1011. The non-contact detection instrument 300 is arranged adjacent to flat optical surface 1013 and projects a light beam (see the arrows in FIG. 3) to the bottom 1014 of the blind holes 1011. Due to the flat optical surface 1013, the light beam can directly pass through the flat optical surface 1013 without any refraction and then reach the bottom 1014 of the blind holes 1011 quickly. The bottom 1014 of the blind holes 1011 is an interface between solid body and gas in the blind holes 1011, when a coarseness factor of the bottom 1014 has been detected, the light beam will be scattered when it reaches the bottom 1014, which forms variations in the reflection pattern of the light beam, thereby generating a coarseness factor image of the bottom 1014 of each of the blind holes 1011. In the illustrated embodiment, the non-contact detection instrument 300 can work on two blind holes 1011 at a time.

The light beam emitted from the non-contact detection instrument 300 can be a collimated parallel light beam. The non-contact detection instrument 300 can be a three dimensional (3D) laser light scanning microscope. The non-contact detection instrument 300 usually has a processor mounted therein, which is loaded with coarseness factor analyzing software.

Third, determine whether the coarseness factor of the bottom 1014 of each of the blind holes 1011 is acceptable based on the analysis of the coarseness factor image. When the coarseness factor of the bottom 1014 of one blind hole 1011 is not acceptable, it means that a modification of the corresponding insert 221 is needed until the coarseness factor is acceptable.

Fourth, move the second mold portion 210 to make the curved surface molding region 211 align with the inserts 221 to form the optical fiber connector 100.

With the above described method, a coarseness factor of the bottom of the blind hole 121 of the optical fiber connector 100 can be satisfied, i.e., less than a predetermine acceptable value, and thus a light loss at the bottom of the blind hole 121 can be reduced.

There can be only one of each the blind hole 121 and the lens cap 112.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A method for making an optical fiber connector, the optical fiber connector comprising a blind hole portion and a lens portion connected to the blind hole portion, the blind hole portion comprising a blind hole for receiving an optical fiber, the lens portion comprising a flat optical surface and a lens cap formed on the flat optical surface and aligned with the blind hole, the method comprising:

provide a mold, the mold comprising a first mold portion configured for molding a blind hole portion preform having a blind hole preform, and a second mold portion configured for molding a lens portion preform having a flat optical surface at an end thereof, the first mold portion comprising an insert for insert molding the blind hole preform, the second mold portion having a flat molding surface for forming the flat optical surface;

forming the blind hole preform using the insert and forming the flat optical surface on the blind hole preform using the flat molding surface, the blind hole preform having a bottom enclosed by the flat optical surface;

providing a non-contact detection instrument adjacent to the flat optical surface, the non-contact detection instrument configured for projecting a light beam to the bottom of the blind hole preform through the flat optical surface, and generating a coarseness factor image of the bottom of the blind hole preform;

analyzing the coarseness factor image to determine whether the coarseness factor of the bottom of the blind hole preform is acceptable;

modifying the insert if the coarseness factor of the bottom of the blind hole preform is not acceptable; and forming a lens cap on the flat optical surface using a curved molding surface.

2. The method of claim 1, wherein the curved molding surface is formed on the second mold portion.

3. The method of claim 1, wherein the non-contact detection instrument is a three dimensional laser light scanning microscope.

4. A method for making an optical fiber connector, the optical fiber connector comprising a blind hole portion and a lens portion connected to the blind hole portion, the blind hole portion comprising a plurality of blind holes each for receiving an optical fiber, the lens portion comprising a flat optical surface located at an end thereof, and a plurality of lens caps formed on the optical surface aligned with the respective blind holes, the method comprising:

providing a mold, the mold comprising a first mold portion having a plurality of inserts each configured for insert molding a blind hole preform, and a second mold portion having a flat molding surface for forming a flat optical surface, and a plurality of curved molding surfaces for forming the lens caps of the optical fiber connector;

forming the blind hole preform using the inserts and forming the flat optical surface on the blind hole preform using the flat molding surface, the blind hole preform having a bottom enclosed by the flat optical surface;

providing a non-contact detection instrument adjacent to the flat optical surface, the non-contact detection instrument configured for projecting a light beam to the bottom of each of the blind hole preforms through the flat optical surface, and generating a coarseness factor image of the bottom of each of the blind hole performs;

analyzing the coarseness factor image to determine whether the coarseness factor of the bottom of the corresponding blind hole preform is acceptable;

modifying the corresponding insert if the coarseness factor of the bottom of one blind hole preform is not acceptable; and aligning the curved molding surfaces with the respective inserts to form the lens caps on the flat optical surface.

5. The method of claim 4, wherein the non-contact detection instrument is a three dimensional laser light scanning microscope.

6. A method for making an optical fiber connector, the method comprising:

molding an optical fiber connector preform, the optical fiber connector preform including a blind hole exposed at a first side and a lens portion located at an opposing second side thereof, the lens portion aligned with the blind hole and having a flat outer surface facing away from the blind hole and an inner surface located at a bottom of the blind hole;

observing the inner surface through the lens portion from the second side to determine whether the optical quality of the inner surface is acceptable;

modifying the inner surface if the optical quality of the inner surface is not acceptable; and forming a lens cap on the flat outer surface if the optical quality of the inner surface is acceptable, the lens cap having a curved outer surface.

7. The method of claim 6, wherein the inner surface is observed using a three dimensional laser light scanning microscope.

* * * * *

UNITED STATES PATENT AND TRADEMARK OFFICE
CERTIFICATE OF CORRECTION

| | |
|---|---|
| PATENT NO. | : 8,273,271 B2 |
| APPLICATION NO. | : 12/913788 |
| DATED | : September 25, 2012 |
| INVENTOR(S) | : Chia-Ling Hsu |

It is certified that error appears in the above-identified patent and that said Letters Patent is hereby corrected as shown below:

On the title page, please replace Item (30) regarding "Foreign Application Priority Data" with the following:

(30)    Foreign Application Priority Data

May 11, 2010    (TW) ......................099114922

Signed and Sealed this
Twenty-ninth Day of October, 2013

Teresa Stanek Rea
*Deputy Director of the United States Patent and Trademark Office*